June 15, 1965  E. F. BEATTY  3,188,916
ACTUATOR AND CONTROL SYSTEMS THEREFOR
Filed Jan. 14, 1963  6 Sheets-Sheet 1
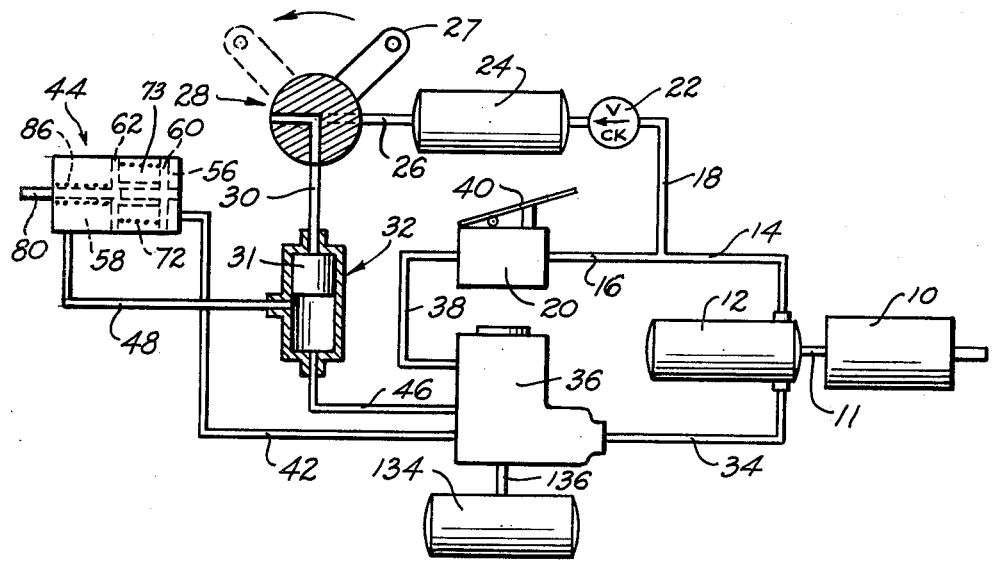
FIG_1
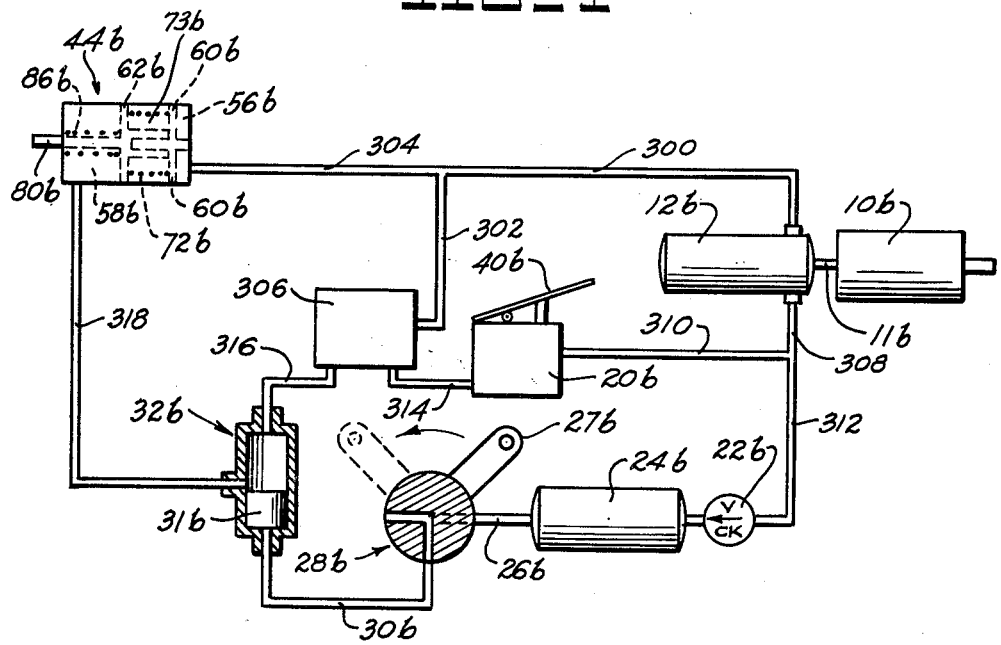
FIG_2
INVENTOR.
EUGENE F. BEATTY.
BY
Sheldon F. Raizes
ATTORNEY

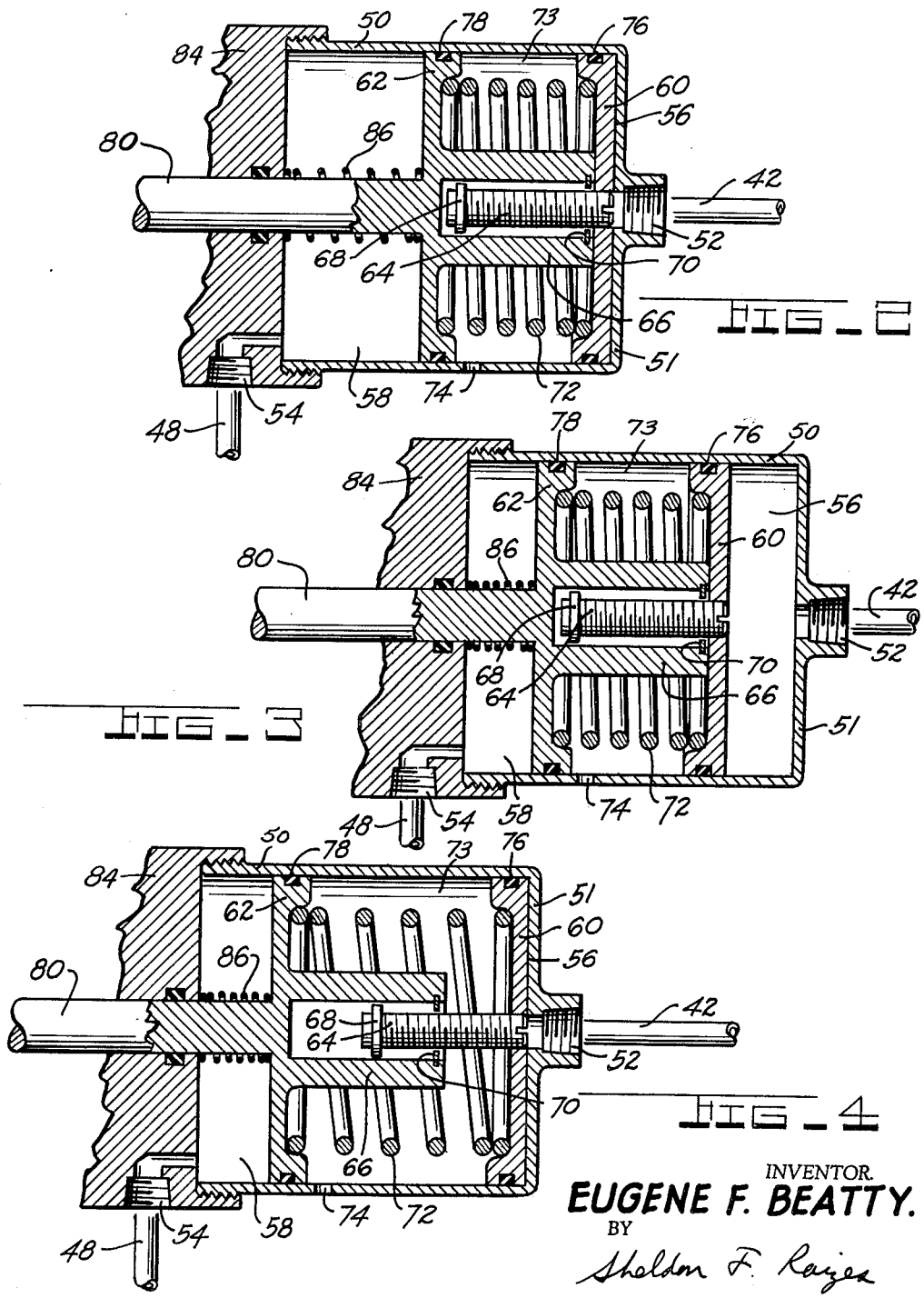

June 15, 1965

E. F. BEATTY 3,188,916

ACTUATOR AND CONTROL SYSTEMS THEREFOR

Filed Jan. 14, 1963

INVENTOR.
EUGENE F. BEATTY.
BY

*Sheldon T. Raizes*

ATTORNEY.

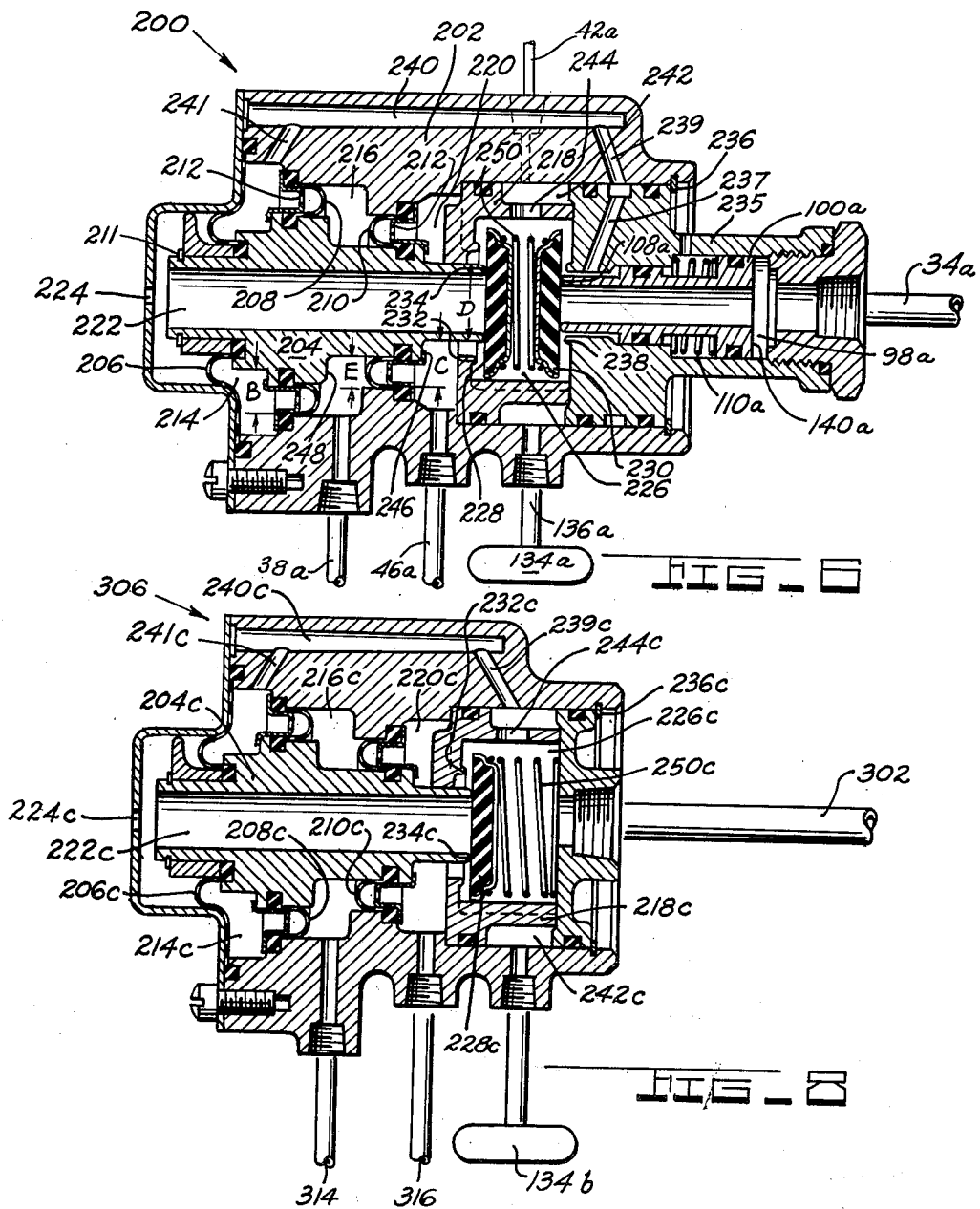

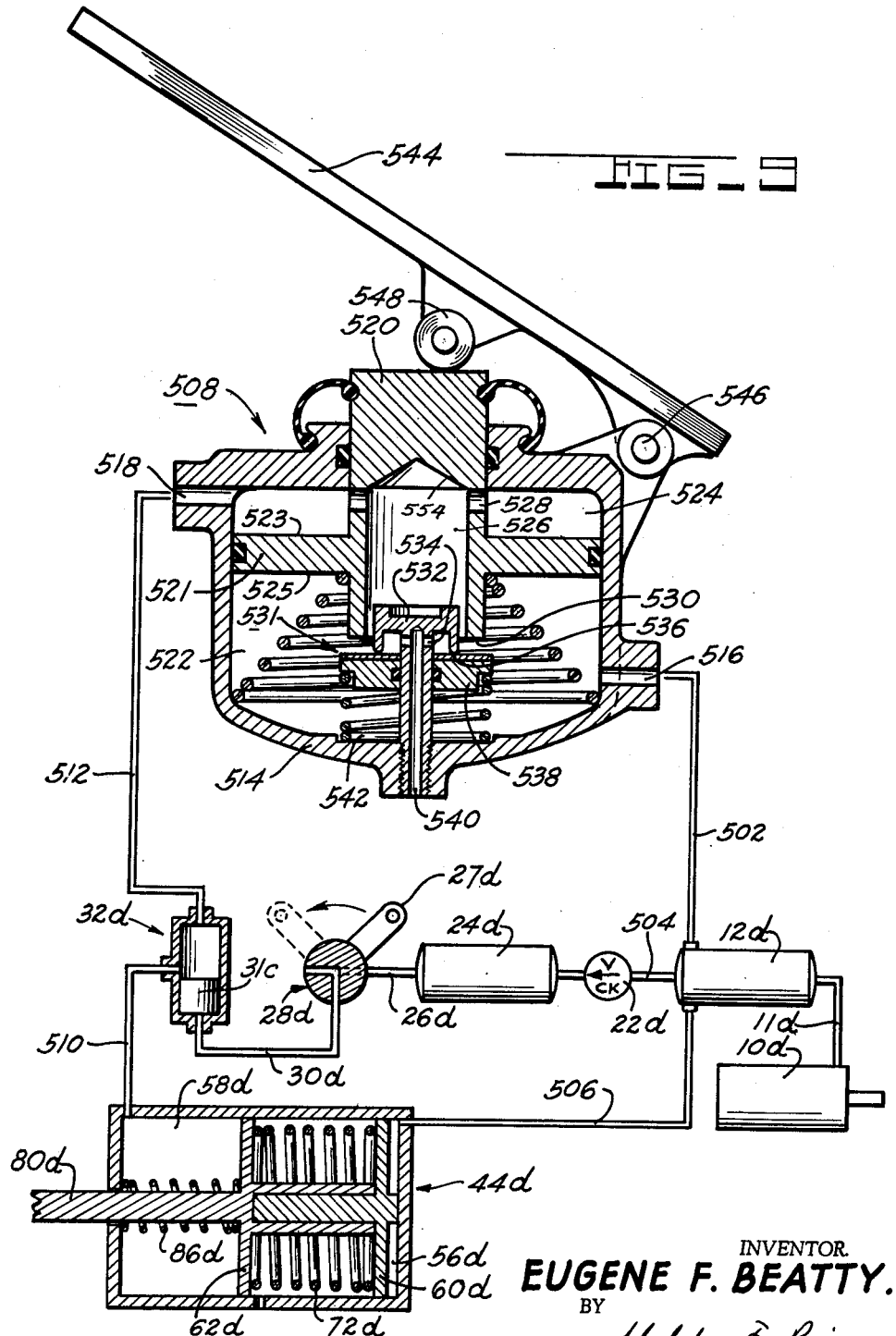

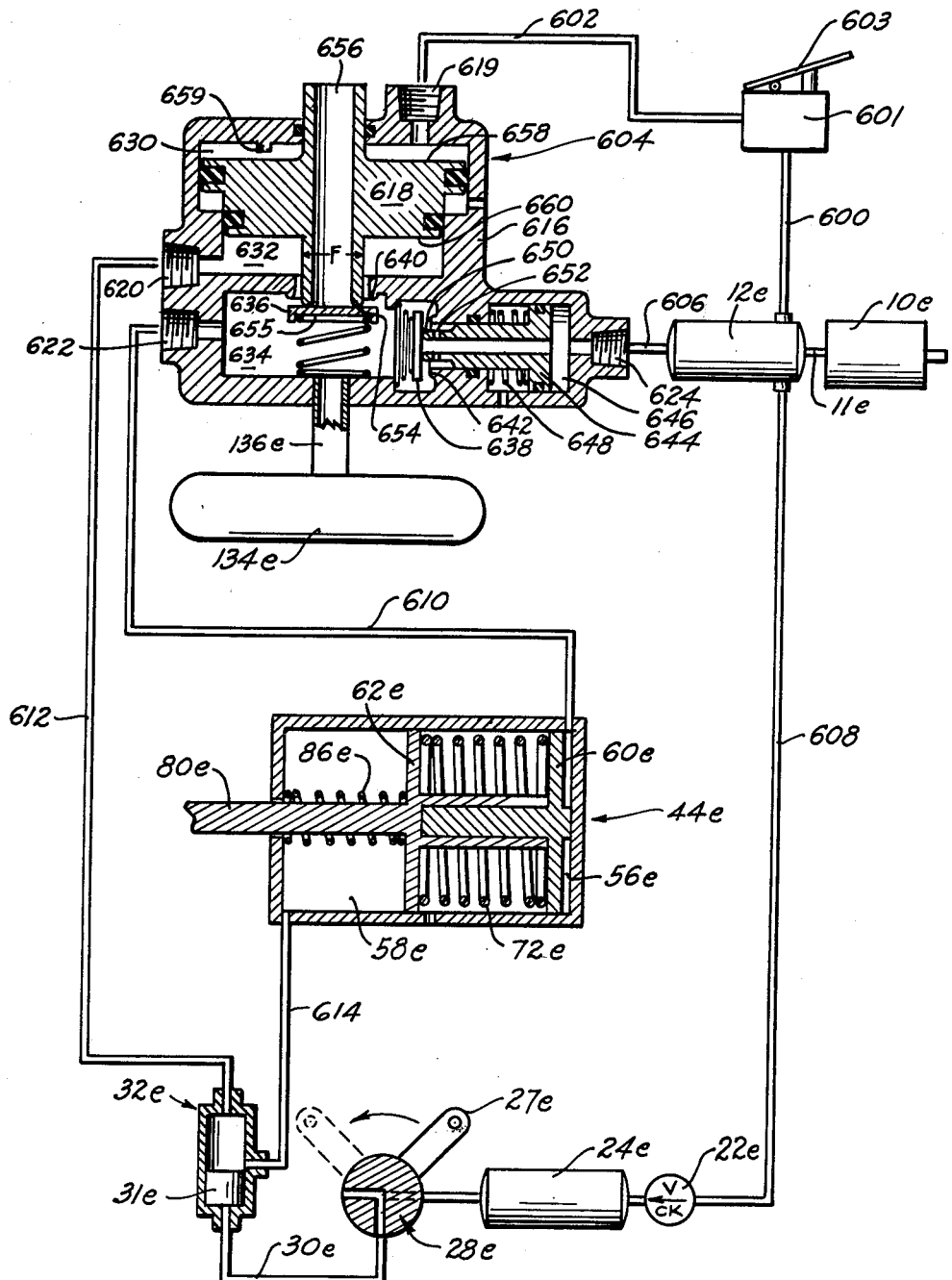
FIG_10

United States Patent Office

3,188,916
Patented June 15, 1965

1

3,188,916
ACTUATOR AND CONTROL SYSTEMS
THEREFOR
Eugene F. Beatty, South Bend, Ind., assignor to The
Bendix Corporation, South Bend, Ind., a corporation
of Delaware
Filed Jan. 14, 1963, Ser. No. 251,391
5 Claims. (Cl. 91—165)

This invention relates to a fluid actuator, a fluid actuating system therefor, and special valve means therefor.

An object of this invention is to produce a fluid actuator wherein actuating fluid under constant pressure continuously acts on a work element to bias it in an actuating direction and fluid pressure acts on said actuating element to resist movement thereof in the actuating direction, and upon release of said last named fluid pressure, said actuating pressure imparts movement of said work element in the actuating direction.

Another object of the invention is to provide a fluid actuator of the type described above with means for imparting movement to the work element notwithstanding failure of fluid actuating pressure.

Still another object of the invention is to provide a compact fluid actuator for effecting the above objects.

A further object of the invention is to provide a fluid actuator of the type described above with a fluid system capable of effecting actuation of the work element under normal conditions or upon failure of actuating pressure.

Still a further object of the invention is to provide a fluid actuator of the type described above with a fluid system including a special type of valve means which, upon a signal imparted to said valve means, releases the pressure tending to resist movement of the work element in the actuating direction.

Other objects of the invention will become apparent to those skilled in the art from the following description with reference to the drawings wherein:

FIGURE 1 is a schematic of a fluid system;

FIGURE 2 is a section view of the fluid actuator illustrated in normal released position;

FIGURE 3 is a section view of the fluid actuator of FIGURE 1 illustrated in normal actuating position;

FIGURE 4 is a section view of the fluid actuator of FIGURE 1 illustrated in an emergency actuating position;

FIGURE 6 illustrates a modified version of the special type valve depicted in FIGURE 5;

FIGURE 7 is a view of another fluid system for the same actuator;

FIGURE 8 is a section view of a special type valve utilized in the system of FIGURE 7;

Figure 5:
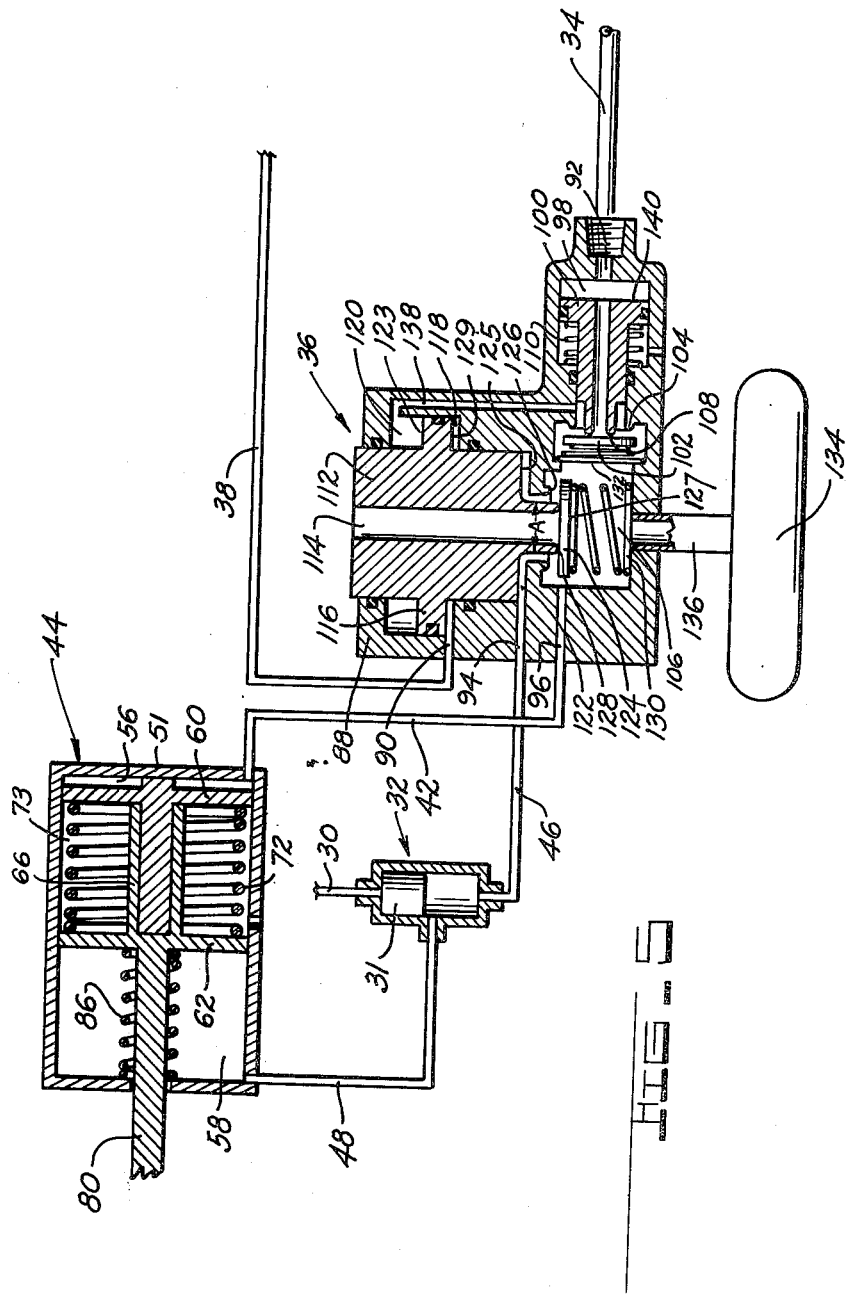
FIGURE 5 is a schematic of a hookup between a special type valve included in the fluid system of FIGURE 1 and the fluid actuator with the valve being shown in cross section and the actuator being illustrated in a simplified version.

FIGURE 9 illustrates another fluid system utilized in conjunction with the same fluid actuator as that of FIGURES 1 and 7 and including a special type of treadle valve illustrated in section; and FIGURE 10 illustrates still another fluid system utilized in conjunction with the same fluid actuator as that of FIGURES 1, 6 and 8, and further including another special type of valve which is illustrated in section.

*FIGURES 1–5*

Referring to FIGURE 1, a compressor 10 supplies air under pressure to a reservoir 12. Line 14 conducts air under pressure from the reservoir 12 to pressure supply lines 16 and 18, the former conducting air under pressure to a treadle valve 20 and the latter conducting air under pressure past a one-way check valve 22 to an emergency reservoir 24. Line 26 communicates air under pressure from the emergency reservoir to an emergency release valve 28 and line 30 communicates the emergency release valve 28 with a two-way check valve 32. Pressure supply line 34 communicates air under pressure from the reservoir 12 to a control valve 36 and line 38 communicates the treadle valve 20 with the control valve 36. The treadle valve 20 has an actuating lever 40 and when the treadle lever 40 is raised as shown, the line 38 is communicated to exhaust and upon depression of the treadle pedal 40, line 38 is communicated to line 16 thereby communicating air under pressure to the control valve 36. Line 42 is normally communicated to line 34 by the control valve 36 and thereby continuously conducts air under constant pressure to one end of a fluid actuator 44 while line 46 is communicated by a shuttle valve member 31 of the two-way check valve 32 to the line 48 which enters the other end of the actuators 44. In this particular system, the compressor 10, the reservoirs, the one-way check valve 22, the treadle valve 20, the emergency release valve 28, and the two-way check valve 32 may be of any well-known construction.

Referring to FIGURE 2, the actuator 44 is illustrated in detail and comprises a housing 50 having ports 52 and 54 which lead to a constant pressure actuating chamber 56 and a variable pressure chamber 58, respectively, separated by a pair of movable walls or pistons 60 and 62 having substantially equal areas exposed to pressure in chambers 56 and 58. The piston 60 has a threaded member 64 extending therefrom telescoping into a tubular portion 66 which is integral with the piston 62. The threaded member 64 has an abutment 68 at the end thereof and the tubular portion 66 has a snap ring 70 arranged for engagement with said abutment for assembly purposes to be described hereinafter. A coil spring 72 is compressed between the two pistons and the chamber 73 between the two pistons is communicated to the atmosphere through a vent 74 located in the housing 50. The piston 60 has an O-ring seal 76 and the piston 62 has an O-ring seal 78 sealing the inner chamber 73 from the pressure chambers 56 and 58. A thrust rod 80 is integral with the piston 62 and extends through the upper wall 84 of the casing 50 for actuating a wedge brake such as that as shown by the patent to Goepfrich, U.S. Patent No. 2,527,126. A coil spring 86 is located between the end wall 84 of the casing 50 and the piston 62 for returning the pistons 60 and 62 to released position. Obviously, the thrust rod 80 may be separate from the piston 62 with only a thrust connection therebetween, which construction would then necessitate a relocation of the return spring 86 outside of the chamber 58.

Referring to FIGURE 5, the special type valve 36 utilized with the actuator 44 is illustrated in more detail and comprises a housing 88 having ports 90, 92, 94 and 96 communicating with the valve 36 control line 38, the constant pressure supply line 34, the variable pressure line 46, and the actuating pressure line 42, respectively. Air from the supply line 34 must pass through an inlet chamber 98 which has a shuttle valve member 100 therein. A poppet valve 102 is adapted to be seated on an annular surface 104 which effects sealing off of a central supply constant pressure chamber 106 from the inlet chamber 98. The shuttle valve member 100 has an annular surface 108 on which the poppet valve member 102 is also adapted to be seated. A spring 110 maintains a force on the shuttle valve for biasing the shuttle valve member 100 to the right.

The valve 36 also contains a control shuttle valve member 112 which has a central tubular chamber 114 leading to atmosphere and a laterally extending flange 116 which separates a control chamber 118 from a balancing chamber 120. A variable pressure chamber 122 is located between the control chamber 118 and the central supply supply chamber 106. A control valve poppet member 124 is adapted to seat on an annular surface 126 of the housing and an annular surface 128 of the control shuttle valve member 112. Springs 130 and 132 maintain their respective valve poppet members 124 and 102, against the annular seat 126 and 104, respectively, during certain conditions and their strength is such as to be insignificant when compared to the pressures that act on the valve poppet members 124 and 102. The annular area of flange surface 123 is equal to the annular area 125 of the central control valve member 112 plus the effective area A on the surface 127 of the poppet valve member 124 when the poppet valve member 124 is seated on the annular seat 128. A reservoir 134 is communicated through line 136 to the central supply chamber 106 and passage 138 communicates the balancing chamber 120 to the chamber 98.

It will be noted that the constant pressure actuating chamber 56 of the actuator is always in communication with the central supply constant pressure chamber 106 of the control valve 36 by the line 42 and the variable pressure control chamber 58 of the actuator is normally in communication with the variable pressure chamber 122 of the control valve 36 through the line 48, check valve 32 and line 46.

Operation

FIGURE 5 illustrates the positions of the various components of the control valve 36 when the fluid actuator 44 is in normal released position. The supply pressure entering into the chamber 98 through line 34 acts on the surface 140 of the shuttle valve member 100 to bias it to the left against the force of the spring 110, thereby engaging the shuttle valve annular surface 108 with the poppet member 102 and maintaining the poppet member 102 off of its seat 104 and communicating the supply chamber 106 with the passage 138 as shown. When the pressure in central chamber 106 falls below the value in the supply line, then the poppet member 102 will be further removed from its seat 103, allowing flow from the supply line into the chamber 106 and to the passage 138 until the pressures of the central control chamber 106, passage 138 and the supply line are equal, at which time the poppet will again seat against the annular surface 108, but remain unseated with respect to the annular surface 104. The passage 138 is always in communication with the chamber 106 unless there is a break in one of the main supply lines. It is readily seen that the pressure in chamber 122 is substantially equal to that of the supply chamber 106 and the pressure in supply chamber 106 is communicated to the balancing chamber 120 past the annular surface 104 and through passage 138. Thus, equal pressures are acting on the surfaces 123, 125 and the effective area of surface 127 of the poppet member 124 with the resultant force acting on surface 123 tending to move the shuttle valve member 112 downwardly and the resultant of the forces acting on surfaces 125 and 127 being equal and opposite to the resultant force acting on surface 123.

Since the pressure chamber 56 of the fluid actuator is always communicated to the supply chamber 106 of the control valve 36, the pressure in chamber 56 will be continuously constant and will always be imparting a force on the pistons 60 and 62 to move them as a unit to the left in actuating direction. Since the pressure chamber 58 of the fluid actuator is communicated to the variable pressure chamber 122 of the control valve 36, the pressure in chamber 58 is equal to the pressure in actuating chamber 56. The force of the pressure in chamber 58 acting on the piston 62 biases it to the right and compresses spring 72 until its tubular portion 66 abuts the piston 60. The combined forces of spring 86 and the pressure in chambers 56 and 58 acting on the pistons 60 and 62 are such that the resultant thereof will move the pistons 62 and 60 as a unit to the right until the piston 60 engages the end wall 51 of the housing 50. It should be noted that since the resultant force of the pressures in chambers 56 and 58 acting on the pistons 60 and 62 are almost equal, the spring 86 need be only strong enough to return the pistons 60 and 62 as a unit against the end wall 51 of the housing. The spring 72 contains a force value of such magnitude to apply a brake, but yet is less than the resultant force of the pressure in chambers 58 and 56 normally acting on each piston 60 and 62 when in released position.

When the operator of a vehicle wishes to apply the brakes, he steps on the treadle pedal 40, depressing the same, and communicating the control line 38 with the pressure line 16 thereby admitting air under pressure to the chamber 118 upsetting the balance of forces on the shuttle valve member 112 and producing a resultant force on the shuttle valve 112 moving the shuttle valve 112 upwardly. Upon upward movement of the shuttle valve 112, the poppet valve 124 will engage the annular seat 126 sealing off the supply chamber 106 from the variable pressure control chamber 122 and then the shuttle valve 112 will move further upwards withdrawing the annular seat 128 from the poppet valve member 124 thereby communicating the variable pressure chamber 122 with the atmospheric chamber 114. Since the chamber 122 is communicated to atmosphere, the control chamber 58 of the actuator will be communicated to atmosphere reducing the pressure therein and the pressure in chamber 56 acting on the piston 60 will move the pistons 60 and 62 as a unit to the left (to the position illustrated in FIGURE 3) imparting a force on the thrust rod 80 for application of the brake. The spring 72 does not spread the pistons 60 and 62 apart since the force acting on the piston 60 by the pressure in chamber 56 and the reaction to movement of the thrust rod and the remaining pressure in control chamber 58 acting on the piston 62 act in opposite directions to compress the spring 72 and obviously are greater than the force of the spring 72.

Upon release of the treadle pedal 40, communication between the pressure line 16 and control line 38 is cut off and the treadle communicates control line 38 with exhaust and thereby control chamber 118 is communicated to exhaust to dump the pressure therein. Since the pressure acting on surface 125 of the shuttle valve member 112 is also communicated to exhaust, the pressure in balancing chamber 120 acts on surface 123 moving the shuttle valve member 112 downwardly until the annular surface 128 engages the poppet valve member 124 sealing off the atmospheric chamber 114 from the variable pressure chamber 122 and then the poppet valve member 124 and shuttle valve 112 move downward together lifting the poppet valve 124 off of its seat 126 to communicate the variable pressure chamber 122 with the supply chamber 106.

Pressure will then be admitted by lines 46, check valve 32, and line 48 to variable pressure chamber 58 building up the pressure therein to substantially equal that in pressure chamber 56, at which time the return spring 86 will move the pistons 60 and 62 as a unit to the right to release position as shown in FIGURE 2. Obviously, the rate of reduction in pressure in control chamber 58 of the actuator and therefore the rate of brake application will depend upon the rate of pressure increase in control chamber 118 which in turn depends upon the force at which the operator depresses pedal 40.

Assuming a break in line 42, failure in pressure will occur in chamber 56. Chamber 122 is communicated by the poppet valve 124 to the chamber 106 which has lost its pressure due to the break in line 42 and thus the pressure in chamber 122 and the pressure in chamber 58 of the actuator will be lost. As soon as the pressure in chamber 58 is reduced to the point where the force acting on the piston 62 to move it to the right is less than the force of the spring 72 tending to move the piston 62 to the left, the spring will actuate the piston 62 to the left imparting a force to the thrust rod 80 for applying the brake automatically.

Assuming a break has occurred in pressure line 34, and the pressure has reduced below that determined by the force value of the spring 110, the spring 110 will move the shuttle valve 100 to the right permitting poppet valve 102 to seat on the annular seat 104 thereby shutting off the inlet chamber 98 and the pressure supply line 34 from the supply chamber 106 and the reservoir 134. Passage 138 will be communicated to the pressure supply line and the pressure in chamber 120 will be bled thereby causing an unbalance of forces acting on the surface 125 and on the poppet valve member surface 127 tending to move the shuttle valve member 112 upwards, whereupon the poppet valve member 124 seats on the annular surface 126 and the shuttle valve 112 annular surface 128 withdraws from the poppet valve member 124 to communicate the variable pressure chamber 122 to atmosphere, thereby bleeding the pressure in chamber 58 and causing actuation of the pistons 60 and 62 to the left as a unit by the pressure in chamber 56 to apply the brakes automatically.

Upon the pressure break in lines 34 or 42, the one-way check valve 22 traps the air in the emergency reservoir 24. In order to release the brake and move the pistons 60 and 62 back to released position, the operator may turn the handle 27 of the emergency release valve to dotted line position thereby communicating line 26 with line 30 with the emergency reservoir 24 being its pressure source. The pressure in line 30 will move the piston 31 cutting off communication between lines 46 and 48, but communicating pressure line 30 with line 48, thereby conducting air under pressure to the chamber 58 to release the brake. Since the reservoir 134 is directly communicated to the chamber 106 and is cut off from the pressure line break by the poppet valve 102, the pressure in chamber 56 will remain constant despite the pressure break in line 34. An operator may continue to actuate the brake by hand by merely pulling the lever 27 of the emergency release valve back to the full line position and exhausting the pressure in lines 48 and 30 and thereby the pressure in chamber 58 whereupon the pressure in chamber 56 against acts to apply the brake. This operation may be repeated as long as the supply in the emergency reservoir 24 is above the spring force. From the above description it appears that if breaks occurred at other points the automatic operation of the actuator 44 for applying the brakes would be obvious.

It will be noted that upon an increase in pressure in the control chamber 118, the pressure acting on the surface 129 of the valve member 112 adds to the pressure forces acting on surfaces 125 and 129 to move the valve upwardly. However, since there is a decrease in pressure in chamber 122, the force acting on surface 125 to move the valve upwardly decreases. Since the effective area A of the poppet is small compared to the area of surface 125, the pressure decrease in chamber 122 will substantially equal the pressure increase in control chamber 118, since upon realization of this condition the pressure in chamber 120 moves the valve member 112 downwardly until the valve seat 128 and poppet valve member 124 cuts off communication between the variable pressure chamber 122 and the exhaust chamber 114 while the valve poppet member 124 remains seated on its seat 126. In other words, the valve member 112 assumes a "lapped" position when the pressure decrease in the variable pressure chamber 122 substantially equals the pressure increase in the control chamber 120.

Referring now to the threaded stem 64, the abutment 68 and snap ring 70, such elements are utilized for maintaining the spring 72 in compressed condition during insertion of the pistons 60 and 62 in the housing 50. The pistons are first interconnected by inserting the threaded member 64 into the tubular portion 66; securing the snap ring 70 to the tubular portion 66, placing the spring 72 between the pistons, and then attaching the piston 60 to the threaded member 64. The threaded member 64 is rotated moving longitudinally to the right engaging the snap ring 70 and thereby squeezing the pistons together. The piston assembly is then placed into the housing 50 and the threaded member rotated until it is in the position relative to the piston 60 as shown in FIGURES 2–4.

FIGURE 6

Referring to FIGURE 6, a modification of the valve 36 is illustrated. Elements, which are the same as in FIGURE 1 and the valve 36, are given the same reference numerals with the small letter *a* attached thereto.

The valve 200 has a housing 202 having a slidable valve member 204. A plurality of diaphragms 206, 208, and 210 extend from the outer surface of the slidable valve member 204 and are connected to the valve housing 202. Clips 212 and a snap ring 211 retain the diaphragms in their respective locations. The diaphragms 206 and 208, the valve member 204, and the housing 200 define a pressure balancing chamber 214; and the diaphragm 208 and 210 define a control chamber 216; and diaphragm 210 and a stationary sleeve 218 define a variable pressure chamber 220. The valve member 204 has a central chamber 222 which is communicated to the atmosphere through an opening 224 in the end of the housing. The stationary sleeve 218 has a constant pressure supply chamber 226 which has a pair of valve poppet members 228 and 230 located therein. The sleeve 218 has an annular seat 232 on which the valve poppet member 228 is adapted to seat and the valve member 204 has an annular seat 234 on which the poppet valve member 228 is adapted to seat. A sleeve 235 containing a valve assembly is located within the housing 202 and is retained therein by a snap ring 236 and also has an annular seat 238 on which the poppet valve member 230 is adapted to seat. A passage 240 leads from a pressure inlet chamber 98a to the balancing chamber 214 and communicates either the pressure supply line 34a or the supply chamber 226 thereto. The valve assembly 100a contained within the sleeve 235 and the poppet valve member 230 operate in the same manner as explained in relation to valve members 100 and 102 of the control valve 36. A reservoir 134a is connected to the pressure inlet and the supply chamber 226 by an annular chamber 242 communicated to the supply chamber 226 by a port 244 in the sleeve 218.

The pressure in the balancing chamber 214 acts on an annular effective area B of the diaphragm 208 tending to move the valve member 204 to the right and the pressure in the variable pressure chamber 220 acts against the lateral surface 246 of the valve member 204 and the diaphragm 210 over an annular area C tending to push the valve member 204 to the left and the pressure in chamber 226 acts on the valve member 228 over an effective area D tending to push the valve member 204 to the left. Area B is equal to area C+area D.

In operation, the various elements of the valve 200 are in the position as illustrated when the fluid actuator is in the released position as illustrated in FIGURES 1 and 2. The pressure in chambers 214, variable pressure chamber 220, and the supply chamber 226 are equal and thus the resultant of the pressures acting on the valve member 204 tending to move the valve member 204 to the right and to the left. When pressure is admitted in the control chamber 216, an unbalance of forces on the valve member 204 moving the valve member to the left will occur due to the larger differential between the area E of the diaphragm 210 and the area of the diaphragm 208 plus the area of the lateral surface 248; the latter combination being greater. The valve member 204 will move to the left allowing spring 250 to seat the poppet valve member 228 against the annular seat 232 of the housing and the annular seat 234 of the valve member 204 will pull away from the poppet valve 228 communicating the chamber 220 to the exhaust chamber to decrease the pressure therein. The valve member 204 will move to lapped position when the pressure decrease in chamber 220 substantially equals the increase in control chamber 216 for the same reason as explained in relation to the valve member 112.

Upon a break in one of the main supply lines, the poppet valve member 230 will close off the supply chamber 226 from the supply line 34a and chamber 214 will be communicated to the supply line 34a reducing pressure therein. An unbalance of forces on the valve member 204 will occur thereby effecting movement of the valve member 204 to the left and communicating the chamber 220 to exhaust again whereupon the fluid actuator will automatically apply the brakes.

FIGURES 7 and 8

Referring to FIGURE 7, there is illustrated a different fluid system for the fluid actuator of FIGURE 1 with similar elements being given the same reference numerals as that of FIGURE 1 with the letter b affixed thereto. A compressor 10b supplies air under pressure through line 11b to a reservoir 12b. A pressure line 300 supplies air under pressure to pressure lines 302 and 304 leading to a control valve 306 and the constant pressure chamber 56b of the fluid actuator 44b, respectively. Pressure line 308 communicates pressure lines 310 and 312 with the treadle 20b and the emergency reservoir 24b, respectively, while control line 314 communicates the control valve 306 with the treadle 20b. Line 316 is communicated with variable pressure chamber line 318 by the two-way check valve 32b.

The valve member 304 is the same as the valve member 200 only the valve assembly of sleeve 235 of the valve 200 is eliminated; an inlet port being substituted therefor. Similar elements of the valve are indicated with the same reference numerals as that of the valve member 200 with small letter c attached thereto. It will be noted that upon depression of the pedal 40b, air under pressure will be supplied to the line 314 and to the chamber 216c causing movement of the valve member 204c to the left thereby reducing pressure in chamber 220c and the control chamber 58b of the fluid actuator which in turn allows actuation thereof and of the brake thereby. Upon release of the treadle pedal 40b, pressure in the control chamber 216c will be partially exhausted permitting the valve member 204c to unseat the poppet valve member 228c from its annular seat 232c and effecting communication between the variable pressure chamber 220c and the pressure supply chamber 226c, thereby effecting release of the actuator. Upon a break in any of the main lines, it can readily be seen that the supply chamber 226c and the passage 240c and therefore the pressure balancing chamber 214c will be directly communicated to the break thereby reducing the pressure in chamber 214c and effecting movement of the valve member 204c to the left to reduce the pressure in chamber 220c and the pressure in the control chamber 58b of the fluid actuator 44b to exhaust. Pressure line 304 and therefore the actuator chamber 56b of the fluid actuator will also be directly communicated to the break and thus, with the pressures in both chambers 52b and 58b being reduced substantially, the spring 72b of the actuator will effect movement of the piston 62b to the left, applying to the brake automatically. If an operator wishes to release the brake, the emergency valve 28b may be utilized in the same manner as in the system of FIGURE 1.

FIGURE 9

FIGURE 9 illustrates another fluid actuating system for the same fluid actuator of FIGURE 1 utilizing a new type of treadle valve. The elements, which are the same as that in the previous systems are given the same reference numerals with the letter d affixed thereto.

A compressor 10d supplies air under pressure to the reservoir 12d. The reservoir supplies air under pressure to supply lines 502, 504, and 506 which lead to a treadle 508, an emergency reservoir 24d and the constant pressure chamber 56d of the fluid actuator 44d respectively. The variable pressure chamber 58d of the fluid actuator 44d is communicated with the treadle valve by pressure lines 510, two-way check valve 32d, and pressure line 512.

The treadle valve 508 comprises a housing 514 having ports 516 and 518 communicating with the pressure supply line 502 and the pressure line 512, respectively. A slidable piston 520 is disposed within a central chamber of the housing 514 and has a flange 521 of equal area surfaces 523 and 525 which separates the central chamber into a constant pressure chamber 522 and a variable pressure chamber 524. The chambers 522 and 524 are communicated to each other by a central passage 526 in the piston, ports 528, and past an annular seat 530. A poppet valve arrangement 531 is located in the constant pressure chamber 522 and comprises a mushroom-shaped member 532 rigidly attached to the housing 514 and having port means 534. The head of the stem has an annular seat 536 on which the poppet valve member 538 is adapted to be seated. A passageway 540 in the stem of the mushroom member 532 is ported to atmosphere. A spring 542 biases the poppet valve member 538 into engagement with a shoulder 536. The treadle 508 further comprises an actuating pedal 544 pivoted to the housing 514 at 546 and has a roller 548 in engagement with the piston 520.

In operation, air under pressure is normally conducted through the supply line 502 to the constant pressure chamber 522 past the annular seat 530 through the passage 526 and through the port 528 to the chamber 524 and from there via the pressure line 512 to a check valve 32d and pressure line 510 to the variable pressure chamber 58d of the fluid actuator. Since the surfaces 523 and 525 are of equal area, the pressure acting on the seat 530 and the conical surface 554 will serve to bias the piston 520 upwards and maintain the piston seat 530 removed from the valve poppet member 538 permitting the communication between chambers 524 and 522. When an operator wishes to actuate the brake or the fluid actuator 44d, he depresses the lever 544 bringing the valve seat 530 into contact with the valve poppet 538, thereby cutting off communication between the constant pressure chamber 522 and the variable pressure chamber 524. Upon further depression of the lever 544, the valve poppet member 538 will be depressed against the spring 542 unseating the poppet 538 from the seat 536 of the mushroom-shaped member 532, thus bringing the passage 526 into communication with atmosphere through ports 534 and thereby decreasing the pressure in valve chamber 524 and the chamber 58d of the fluid actuator 44d thereby effecting actuation of the fluid motor and of the brake.

Obviously, if there is a pressure break in any of the main pressure lines, each of the chambers 56d and 58d of the fluid actuator 44d will be in direct communication therewith and the pressure therein will be released thereby effecting automatic actuation of the brake by the spring 72d. If it is desired by the operator to release the brake after an emergency application by the spring, then he must turn the handle 27d of the emergency release valve 28d to the dotted line position, which will then connect the chamber 58d with air under pressure from the emergency reservoir 24d and causing movement of the piston 62d against the spring 72d as previously described. Emergency actuation of the fluid actuator will always be affected by the spring 72d in this system.

The operator of a vehicle will get a pressure reaction through the pedal 544 and piston 520 since upon actuation there will be pressure differential across the flange 521 (which is the same as the pressure differential between chambers 56c and 58c) resisting movement of the piston downwardly. The rate of pedal force application will determine the rate of brake actuation.

FIGURE 10

FIGURE 10 illustrates another fluid system utilizing a different type of control valve for the same fluid actuator of FIGURE 1. The elements, which are the same as that in FIGURE 1, are given the same reference numerals with the letter e affixed thereto.

A compressor 10e supplies air under pressure by line 11e to the reservoir 12e. Pressure line 600 communicates the treadle 601 and the reservoir 12e and line 602 communicates the treadle 601 with a valve 604. Pressure supply lines 606 and 608 communicate the reservoir 12e to the valve 606 and to the emergency reservoir 24e, respectively. Pressure line 610 communicates the valve 604 with the pressure actuating chamber 56e of the fluid actuator 44e and pressure line 612 communicates the valve via the two-way check valve 32e and pressure line 614 with the variable pressure control chamber 58e of the fluid actuator 44e.

The control valve 604 comprises a housing 616 having a slidable piston 618 therein. The housing 616 has ports 619, 620, 622 and 624 communicating with pressure lines 602, 612, 610 and 606, respectively. The piston and housing 616 comprise a control chamber 630, a variable pressure chamber 632 and a constant pressure supply chamber 634. The control valve 604 contains poppet valve members 636 and 638 which are adapted to seat on annular surfaces 640 and 642 of the housing, respectively. A shuttle valve 644 is disposed within an inlet chamber 646 and has a spring 648 acting thereon to bias the valve member 644 to the right. An annular seat 650 is provided on the shuttle valve member 644 for engaging the poppet valve member 638. The shuttle valve 644 further has ports 652 so located that when the poppet valve member 638 is dislodged from its seat 642, the chamber 634 will always be in communication with the supply inlet line 606. The piston 618 has an annular seat 654 on which the valve poppet member 636 is adapted to be seated and also has a tubular chamber 656 which is exposed to the atmosphere. The annular area of the surface 658 of the piston is equal to the annular area of the surface 660 and the effective area F of the surface 655 of the valve poppet member 636 when the valve poppet member 636 is seated on the annular surface 654. A stop 659 is integral with the housing and limits the upward movement of the piston.

In operation, when the fluid actuator is in normal released condition, the shuttle valve member 644 takes the position as illustrated in FIGURE 10 for the same reasons as explained with relation to the valve member 100 of control valve 36e and thus the supply line is, under normal operating conditions, always in communication with the supply chamber 634, with reservoir 134e and with the constant pressure control chamber 56e of the fluid actuator. The variable pressure chamber 632 is also in communication with the supply line 606 via supply chamber 634 and thus, through line 612, two-way check valve 32e, and pressure line 614, pressure is conducted to the control chamber 58e of the fluid actuator. In this instance, the treadle 601 in its normal position, communicates line 602 with the supply line 600 and thus maintains a constant supply line pressure in the balancing chamber 630. The treadle is of the type illustrated in FIGURE 9. Since the annular area 658 is equal to the annular area of the surface 660 and the effective area F of the surface 655, the resultant of the forces acting on the piston 618 to move the piston in opposite directions will cancel out. When the operator of a vehicle wishes to actuate the brakes, he depresses the treadle lever 603 and cuts off communication between the supply line 600 and pressure line 602 and communicates pressure line 602 to exhaust, thereby reducing the pressure in chamber 630, which results in an unbalance of forces to move the piston 618 upwardly. The poppet member 636 will seat on the annular surface 640 and then the seat 654 will be withdrawn from the poppet member 636, reducing the pressure in the variable pressure control chamber 58e of the fluid actuator 44e whereby the pistons will be actuated to apply a brake.

It will be noted that upon a decrease in pressure in the control chamber 630, the resultant force of the pressure acting on the surface 658 biasing the valve member 618 downwardly decreases. However, since the pressure in chamber 632 is decreasing, the resultant force thereof acting on surface 660 biasing the valve member 618 upward decreases. Since the effective area F of the poppet valve member 636 is small compared to the area of surface 660, the pressure decrease in chamber 632 will substantially equal the pressure decrease in control chamber 620, since upon realization of this condition, the pressure in chamber 630 moves the valve member 618 downwardly until the valve seat 654 and poppet valve member 636 cuts off communication between the variable pressure chamber 632 and the exhaust chamber 656 while the valve poppet member 636 remains seated on its seat 640. In other words, the valve member 112 assumes a "lapped" position when the pressure decrease in the variable pressure chamber 632 substantially equals the pressure decrease in the control chamber 630.

If there is a break in one of the main pressure supply lines, the pressure in balancing chamber 630 will automatically be reduced due to the direct communication between the line 602 and the break. Reduction in pressure will also occur in line 606 resulting in the poppet valve 638 seating against the annular surface 642, due to the spring 648 moving the shuttle valve member 644 to the right, thereby cutting off the chamber 634 and reservoir 134e from the supply line. Upon reduction of pressure in chamber 630, the piston 618 will move upwardly to communicate the variable pressure control chamber 58e of the fluid actuator to exhaust thereby effecting an automatic brake application as previously described. The emergency release valve 28e will again be utilized in the same manner as explained with relation to the embodiment of the system of FIGURE 1.

The systems herein described have utilized air as a pressure medium, however, the systems may be adapted to other fluid pressure mediums such as liquids or other gases.

Other revisions or variations of the invention will become apparent to those skilled in the art and will suggest themselves from specific applications of the invention. It is intended that such variations and revisions which are within the ordinary skill of the art be included within the scope of the following claims as equivalents thereof.

I claim:

1. In a fluid actuating system: an actuator comprising a housing having a chamber therein, an expandible unit slidable in said chamber along the axis thereof and separating said chamber into a front pressure chamber and a rear pressure chamber, said housing having separate port means for communicating fluid pressure to said pressure chambers, force transmitting means extending into said front pressure chamber and operatively connected to said unit, means carried by said unit exerting a longitudinal expanding force on said unit, means for maintaining a given pressure in said rear pressure chamber, means normally maintaining a given pressure in said front pressure chamber, stop means located for engagement by said unit, said given pressures being so proportioned and said unit being so constructed that the resultant of axial forces normally acting on said unit will bias said unit rearwardly and maintain said unit against said stop means and act against said unit expanding means to maintain said unit at a normal length, means for lowering the pressure in said front chamber a sufficient amount whereby the resultant of axial forces acting on said unit will act against said unit expanding means to maintain said unit at a normal length and move said unit forwardly away from said stop means imparting force to said force transmitting means and whereby upon failure of pressure in said rear chamber below an amount determined by the unit expanding means force and upon lowering of pressure in said front chamber below an amount determined by said unit expanding means, said unit will expand longitudinally to transfer force to said force transmitting member.

2. In a fluid actuating system: an actuator comprising a housing having a chamber therein, front and rear relatively movable walls slidably disposed within said chamber and separating said chamber into a front outer pressure chamber, a rear outer pressure chamber and an inner chamber between said walls, said housing having separate port means communicating with said front and rear chambers, force transmitting means extending within said front chamber and operatively connected to the front wall, resilient means interposed between said walls for biasing said walls apart, means communicating with said rear chamber port means for maintaining a given pressure in said rear chamber, means communicating with said front chamber port means normally maintaining a given pressure in said front chamber, stop means located for engagement by one of said walls, said given pressures being so proportioned and said walls being so constructed that the resultant of axial forces normally acting on said walls will bias said walls as a unit rearwardly and maintain said walls as a unit against said stop means and act against the force of said resilient means to maintain a normal predetermined space between said walls, means for lowering the pressure in said front chamber a sufficient amount whereby the resultant of the axial forces acting on said walls will maintain said normal space between said walls and move said walls as a unit forwardly away from said stop means thereby transferring force to said force transmitting means and whereby upon failure of pressure in said rear chamber below an amount determined by the force exerted on said walls by said resilient means and upon lowering of pressure in said front chamber below an amount determined by the force of said resilient means, said resilient means will spread said walls longitudinally apart to apply force to said force transmitting means.

3. A fluid actuating system comprising: a fluid motor including a housing having a chamber therein, pressure responsive means separating said housing into two pressure chambers, force transmitting means extending through one of said chambers operatively connected to said pressure responsive means, separate port means for each of said pressure chambers, a pressure source, means including valve means operatively connected to said port means and being so constructed to alternately communicate said one chamber to exhaust and then to said pressure source for bringing the pressure in said one chamber back to normal upon successive signals imparted to said valve means and to communicate the other of said pressure chambers with said pressure source and maintain constant pressure therein, said valve means being so constructed to communicate said one pressure chamber with exhaust upon failure of pressure from said pressure source, whereby upon exhaustion of pressure in said one chamber said pressure responsive means will be actuated by the pressure in said other chamber thereby imparting force to said force transmitting member.

4. A fluid actuating system comprising: a pressure source; reservoir means; a fluid motor; said fluid motor including a housing having a chamber therein, pressure responsive means separating said housing into two pressure chambers, force transmitting means extending through one of said chambers operatively connected to said pressure responsive means, first means communicating said pressure source to said reservoir means and communicating said pressure source and said reservoir means to said one pressure chamber; second conduit means communicating said first conduit means and said reservoir means with the other of said pressure chambers; valve means located in said first conduit means; said valve means normally communicating said pressure source to said reservoir means, to said second conduit means and to said one pressure chamber; said valve means being responsive to a signal imparted thereto cut off communication between said pressure source and said one chamber and communicate said one chamber to exhaust; means for imparting signals to said valve means; said valve means being responsive to a pressure drop in said conduit means between said pressure source and said valve means to isolate said reservoir and said second conduit means from said pressure source and communicate said one chamber to exhaust; whereby upon failure of pressure from said pressure source the pressure in said one chamber will be communicated to exhaust by said valve means and said pressure responsive member will be actuated by the pressure in said reservoir.

5. A fluid actuating system comprising: a pressure source; first and second reservoir means; a fluid motor; said fluid motor including a housing having a chamber therein, pressure responsive means separating said housing into two pressure chambers, force transmitting means extending through one of said chambers operatively connected to said pressure responsive means; first conduit means communicating said pressure source to said first and second reservoir means and to said one pressure chamber; first and second valve means located in said first conduit means; second conduit means communicating one of said reservoirs to one of said valve means; third conduit means communicating the other of said pressure chambers with the other of said reservoir means and said first conduit means, said one valve means being constructed to normally communicate the other of said valve means with said one chamber; said other valve means normally communicating said pressure source to said other reservoir means, to said one valve means and to said third conduit means; said other valve means being responsive to a signal imparted thereto to cut off communication between said pressure source and said one valve means and communicate said one valve means to exhaust; means for imparting signals to said other valve means; said other valve means being responsive to a pressure drop in said first conduit means between said pressure source and said other valve means to isolate said other reservoir and said third conduit means from said pressure source and communicate said one valve means to exhaust; said one valve means being responsive to signals imparted thereto to cut off communication between said one chamber and said other valve means and communicate said one reservoir with said one chamber and to re-establish communication between said one chamber and said other valve means; means for imparting a signal to said one valve means; whereby upon failure of pressure from said pressure source, the pressure in said one chamber will be communicated to exhaust by said other valve means and said pressure responsive member will be actuated by the pressure in said other reservoir, and upon a signal imparted to said one valve means, said one valve chamber will be supplied by pressure from said one reservoir to release said pressure responsive member from an actuating position.

References Cited by the Examiner

UNITED STATES PATENTS

| | | | |
|---|---|---|---|
| 577,511 | 3/96 | Lee | 91—166 |
| 560,918 | 5/96 | Oderman | 92—84 |
| 772,842 | 10/04 | Spencer | 92—130 |
| 2,259,815 | 10/41 | Greve | 92—84 |
| 2,970,614 | 2/61 | Christensen | 137—627.5 |
| 2,973,782 | 3/61 | Sprague | 137—627.5 |
| 2,990,816 | 7/61 | Vincent | 91—165 |

FRED E. ENGELTHALER, *Primary Examiner.*

SAMUEL LEVINE, *Examiner.*

UNITED STATES PATENT OFFICE
CERTIFICATE OF CORRECTION

Patent No. 3,188,916                                          June 15, 1965

Eugene F. Beatty

It is hereby certified that error appears in the above numbered patent requiring correction and that the said Letters Patent should read as corrected below.

Column 11, line 70, after "first" insert -- conduit --.

Signed and sealed this 28th day of December 1965.

SEAL)
Attest:

ERNEST W. SWIDER                                            EDWARD J. BRENNER
Attesting Officer                                              Commissioner of Patents